United States Patent
Huang et al.

(10) Patent No.: US 11,720,575 B2
(45) Date of Patent: Aug. 8, 2023

(54) COMPUTER DATABASE ACCESS SYSTEM AND METHOD FOR CATEGORIZING BY STYLE RANKING

(71) Applicant: Rakuten Group, Inc., Tokyo (JP)

(72) Inventors: Grace Tzu-Wei Huang, San Francisco, CA (US); Phil Kallos, San Francisco, CA (US)

(73) Assignee: Rakuten Group, Inc., Tokyo (JP)

( * ) Notice: Subject to any disclaimer, the term of this patent is extended or adjusted under 35 U.S.C. 154(b) by 56 days.

(21) Appl. No.: 15/001,142

(22) Filed: Jan. 19, 2016

(65) Prior Publication Data
US 2016/0210292 A1    Jul. 21, 2016

Related U.S. Application Data

(60) Provisional application No. 62/104,642, filed on Jan. 16, 2015.

(51) Int. Cl.
*G06F 16/2457* (2019.01)
*G06F 16/248* (2019.01)
*G06F 16/28* (2019.01)
*G06F 16/9535* (2019.01)
(Continued)

(52) U.S. Cl.
CPC ...... *G06F 16/24578* (2019.01); *G06F 16/248* (2019.01); *G06F 16/285* (2019.01); *G06F 16/9535* (2019.01); *G06F 16/9536* (2019.01); *G06F 16/9538* (2019.01)

(58) Field of Classification Search
CPC ........... G06F 17/3053; G06F 17/30554; G06F 17/30598; G06F 17/30867; G06F 16/24578; G06F 16/285; G06F 16/9535; G06F 16/248; G06F 16/9536; G06F 16/9538
See application file for complete search history.

(56) References Cited

U.S. PATENT DOCUMENTS 6,460,036 B1 * 10/2002 Herz ............... G06Q 30/02
                                                    707/748
7,162,443 B2    1/2007 Shah
7,328,176 B2    2/2008 Farvydas et al.
(Continued)

FOREIGN PATENT DOCUMENTS

JP    2008-040753    2/2008
JP    2013-218697    10/2013
(Continued)

OTHER PUBLICATIONS

Nakamura, "Out-of-Browser" Function Supported Outside the Web Browser, Oct. 1, 2009, vol. 94, p. 154-155.
(Continued)

*Primary Examiner* — Alford W Kindred
*Assistant Examiner* — Lin Lin M Htay
(74) *Attorney, Agent, or Firm* — Lessani Law Group, PC

(57) ABSTRACT

In one embodiment, the present invention is directed to a method implemented on a computer system of database retrieval including organizing and suggesting search results by style, not just product category. In one embodiment, a computer implemented smoothing algorithm is used to adjust the ranking feature calculations from insufficient data. The use of smoothing improves the statistical confidence of the ranking features, creating a product ranking that is robust to small sample bias.

15 Claims, 6 Drawing Sheets

(51) Int. Cl.
   *G06F 16/9536* (2019.01)
   *G06F 16/9538* (2019.01)

(56) References Cited

U.S. PATENT DOCUMENTS

| | | | | |
|---|---|---|---|---|
| 8,176,067 | B1* | 5/2012 | Ahmad | G06F 16/313 707/765 |
| 8,224,935 | B1* | 7/2012 | Bandopadhyay | G06F 9/5072 709/221 |
| 8,359,309 | B1* | 1/2013 | Provine | G06F 17/30646 707/721 |
| 8,527,436 | B2 | 9/2013 | Salaka et al. | |
| 8,661,029 | B1* | 2/2014 | Kim | G06F 17/3053 707/723 |
| 8,676,665 | B2 | 3/2014 | Farvydas et al. | |
| 8,694,511 | B1* | 4/2014 | Corduneanu | G06F 17/30867 707/723 |
| 8,935,192 | B1 | 1/2015 | Ventilla et al. | |
| 9,779,441 | B1* | 10/2017 | Jadhav | G06Q 30/0627 |
| 2001/0049628 | A1 | 12/2001 | Icho | |
| 2001/0056359 | A1* | 12/2001 | Abreu | A61B 5/4848 705/3 |
| 2006/0085255 | A1* | 4/2006 | Hastings | G06Q 30/02 705/14.4 |
| 2006/0129463 | A1 | 6/2006 | Zicherman | |
| 2007/0033531 | A1* | 2/2007 | Marsh | G06F 16/951 707/E17.108 |
| 2007/0203784 | A1 | 8/2007 | Keller et al. | |
| 2008/0005090 | A1* | 1/2008 | Khan | G06F 17/30864 |
| 2008/0033939 | A1* | 2/2008 | Khandelwal | G06F 17/30707 |
| 2008/0091546 | A1 | 4/2008 | Kirovski et al. | |
| 2008/0109327 | A1* | 5/2008 | Mayle | G06Q 30/0603 705/27.1 |
| 2008/0120129 | A1* | 5/2008 | Seubert | G06Q 10/06 705/35 |
| 2008/0294643 | A1 | 11/2008 | Moss et al. | |
| 2009/0099920 | A1* | 4/2009 | Aharoni | G06Q 30/02 705/14.26 |
| 2010/0049538 | A1* | 2/2010 | Frazer | G06Q 30/02 705/14.4 |
| 2010/0070448 | A1* | 3/2010 | Omoigui | H01L 27/14645 706/55 |
| 2011/0035379 | A1* | 2/2011 | Chen | G06K 9/6226 707/740 |
| 2011/0060998 | A1 | 3/2011 | Schwartz et al. | |
| 2011/0131098 | A1 | 6/2011 | Bafia et al. | |
| 2011/0191310 | A1* | 8/2011 | Liao | G06F 17/30616 707/706 |
| 2012/0158705 | A1* | 6/2012 | Konig | G06F 16/58 707/723 |
| 2012/0271691 | A1 | 10/2012 | Hammad et al. | |
| 2012/0284108 | A1 | 11/2012 | Fontana et al. | |
| 2012/0311509 | A1 | 12/2012 | Maggiotto et al. | |
| 2013/0304563 | A1 | 11/2013 | Haupt et al. | |
| 2014/0006165 | A1 | 1/2014 | Grigg et al. | |
| 2014/0143251 | A1* | 5/2014 | Wang | G06F 16/285 707/737 |
| 2014/0207551 | A1 | 7/2014 | Van Der Spoel | |
| 2014/0279214 | A1 | 9/2014 | Wagoner-Edwards et al. | |
| 2015/0032522 | A1 | 1/2015 | Dintenfass et al. | |
| 2015/0032538 | A1 | 1/2015 | Caiman et al. | |
| 2015/0032602 | A1 | 1/2015 | Blackhurst et al. | |
| 2015/0088607 | A1 | 3/2015 | Georgoff et al. | |
| 2015/0112789 | A1 | 4/2015 | Yadati et al. | |
| 2015/0178820 | A1 | 6/2015 | Green et al. | |
| 2015/0347595 | A1 | 12/2015 | Norman et al. | |
| 2017/0039583 | A1 | 2/2017 | Aissa | |
| 2017/0148046 | A1 | 5/2017 | Akbarpour Mashadi et al. | |

FOREIGN PATENT DOCUMENTS

| | | |
|---|---|---|
| JP | 2015-082134 | 4/2015 |
| KR | 20100040829 | 4/2010 |
| WO | 2014205552 | 12/2014 |

OTHER PUBLICATIONS

Curty, Renata et al., "Social Commerce: Looking Back and Forward", ASIST 2011, Oct. 9-13, 2011, 10 pages.

Hong, Hsuan et al., "Determining advanced recycling fees and subsidies in "E-scrap" reverse supply chains", Journal of Environmental Management 92 (2011), pp. 1495-1502.

XXiudan, Yang et al., "Ontology-based information extraction system in E-commerce websites", IEEE 2011, 4 pages.

* cited by examiner 302  304
Style  Feature/Category
Bamboo handle

| Gucci® |
| --- |
|  |
|  |
|  |

Modern

| Jaguar Print |
| --- |
| Flora |
| Crocodile |
| Straw |
| Ostrich |

Figure. 3

COMPUTER DATABASE ACCESS SYSTEM AND METHOD FOR CATEGORIZING BY STYLE RANKING

CROSS-REFERENCES TO RELATED APPLICATIONS

This application claims the benefit priority of U.S. Provisional Patent Application No. 62/104,642, filed Jan. 16, 2015, which is herein incorporated by reference in its entirety.

BACKGROUND OF THE INVENTION

The present invention relates to computer database access systems that improve search relevance and ranking for product searches, in particular to ranking of search results in response to a user product query on a website.

A variety of algorithms exist for ranking search results on the Internet. Search engines typically use past history of the user, along with history of other users who typed in the same terms. User profiles can be created, and a variety of factors (features) can be included in the algorithm. When there is insufficient data for a particular feature, the resulting ranking may reflect the small sample bias.

Searching for products on a website brings into play different concerns than a general web search for information. Current search algorithms search based on near exact match of query terms and product categories, which often give only a coarse correlation to what a user is searching for. It is also desirable to have a method for appropriately ranking product searches.

BRIEF SUMMARY OF THE INVENTION

In one embodiment, the present invention is directed to a method implemented on a computer system of database retrieval including organizing and suggesting search results by style, not just product category. Style is often thought of as an ephemeral concept, and often the user herself may not know how to describe the style. Style is not only difficult to discern from product categories, it is also not obvious from similar user profiles. Both old and young women, for example, may like a particular designer of handbags. Embodiments of the present invention use the search terms to determine a style by mapping to appropriate database categories, and thus the selection of products to display in the results. The invention provides more relevant data more rapidly than prior methods. "Fetch" is sometimes used herein to refer to an instance of including an item or product in search results for display to a user. For example, an item or product is said to be "fetched" when it is included in search results that are outputted for display to a user. "User-selection" is sometimes used herein to refer to an instance of a user selecting (clicking on) an item or product that is included in search results.

In one embodiment, the present invention provides a method for ranking product search results based on style. In particular, the style can be a non-demographic factor, such as a particular designer, an era (1920s), an occasion (cocktail or wedding dress), etc. Similar designers can be correlated based on shared popularity within user profiles. Other factors can contribute to style, such as country of manufacture (e.g., Italian v. Chinese handbags), and particular features. For example, handbags that have double stitching, palladium hardware and soft leather can be indicative of a particular style. Other features may be associated with a particular designer, such as bamboo-handled bags for Gucci®.

In one embodiment, a computer implemented smoothing algorithm is used where there is insufficient data in the database. In the smoothing algorithm, instead of only using data for the product of interest, the data of its parent and ancestral category in the database is also used. For example, for calculating a feature for a Gucci® bag, we not only use data from the database for the particular product, but also data from the database from its parent category (handbags) and ancestral category (women's accessories) for the product ranking.

BRIEF DESCRIPTION OF THE DRAWINGS

FIG. 3 is a diagram of a style table stored in a database and used in FIG. 2 by the computer system according to an embodiment of the present invention.

DETAILED DESCRIPTION OF THE INVENTION

Style Ranking

Figure 1:
FIG. 1 is a diagram of a computer generated search results page as displayed on a computer monitor or other device display according to an embodiment of the present invention.

FIG. 1 is a diagram of a computer generated search results page as displayed on a computer monitor or other device display according to an embodiment of the computer database access system of present invention. The graphical user interface includes a search box 102 which shows an example search string from a user, "modern Gucci® bag with bamboo handle." Product results from a search based on this search string are shown as results 104, 106, 108, etc. These search results are in ranked order based on a method using style inference and smoothing according to embodiments of the invention, as described below.

In the search string example of FIG. 1, the search terms can be classified as category and/or style terms. A category term indicates a class of products, such as shoes, dresses, watches, etc. In the example search string "modern Gucci® bag with bamboo handle," the term "bag" is a category. Certain terms which are features can also be categories or subcategories. For example, "handle" and "bamboo" can be subcategories. However, the term "modern" may not be a category, and may instead be a style. The term "Gucci®" is both a category and a style. Examples of a pure style term would be "flashy," "sporty," and "trendy."

In general, for category terms, the user wants to see items in that category. For this search, the user wants to see bags, not shoes. For style terms, the user may want to see alternatives. For example, "modern" may suggest an interest in other brands with modern bags other than Gucci®.

Figure 2:
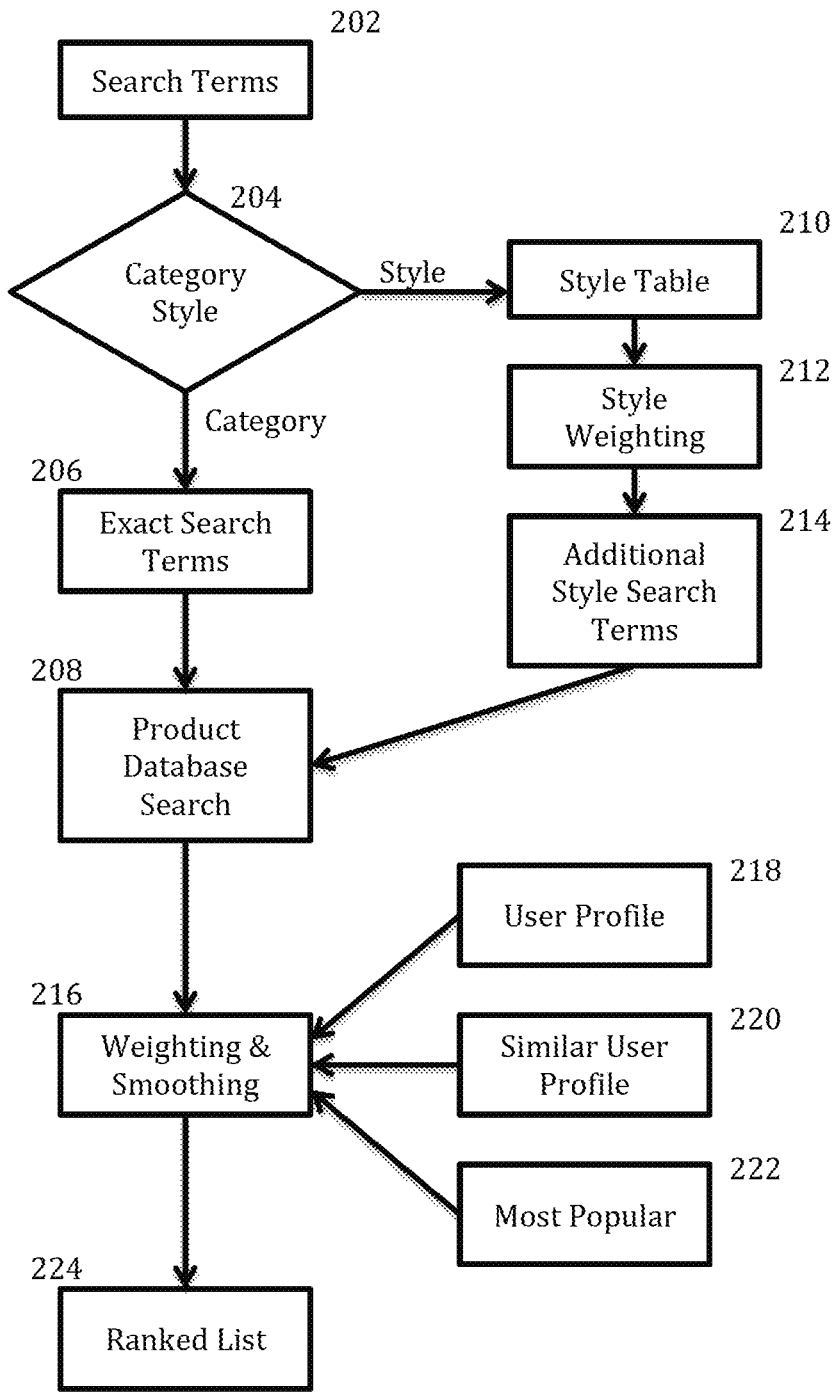
FIG. 2 is a diagram of a computer implemented database access search ranking software process according to an embodiment of the present invention.

FIG. 2 is a diagram of a computer implemented database access search ranking software process according to an embodiment of the present invention. One or more search terms 202 are entered by a user on a computer, tablet, mobile device or other computing device. The search terms are digitized, encrypted and packetized, then are transmitted over the Internet or other network to a remote server or computer system. A processor at the remote server or computer system performs analytics on the search terms. A determination is made if each term is a category, style, or both (step 204). If a term is a category, it is passed (step 206) to a product database search (step 208). If a term is a style, it is applied to a style table 210, with the resulting style terms being weighted (step 212). These are used as additional search terms (step 214) for the product database search 208.

Search results from the product database search are processed using a weighting and smoothing algorithm 216. The weighting uses the assigned style weights, as well as weights from the user's own profile (step 218), the profiles of similar users (step 220) and the most popular searches, most fetches, most purchases, etc. (step 222). In addition to the weighting, a smoothing process is used for items with limited history data, as described in more detail below. Based on the weighting and smoothing, a ranked list is generated (step 224) and displayed to the user.

FIG. 3 is a diagram of a style table stored in a database and used in FIG. 2 by the computer system according to an embodiment of the present invention. Search terms that are determined to be style terms are matched by a processor to an index column 302. The style table includes features and/or categories that correspond to each style term. In one example, a user may search for a "modern bamboo handle bag." In this example, "modern" is a style term and is deemed to include jaguar print, flora, crocodile, straw and ostrich. Thus, bags of various designers with these features will be displayed to the user. In this example, "bamboo handle," while a feature, can also be considered a style because of its association with the Gucci® brand. Thus, Gucci® bags may be shown more prominently in the search results.

Smoothing

Figure 4:
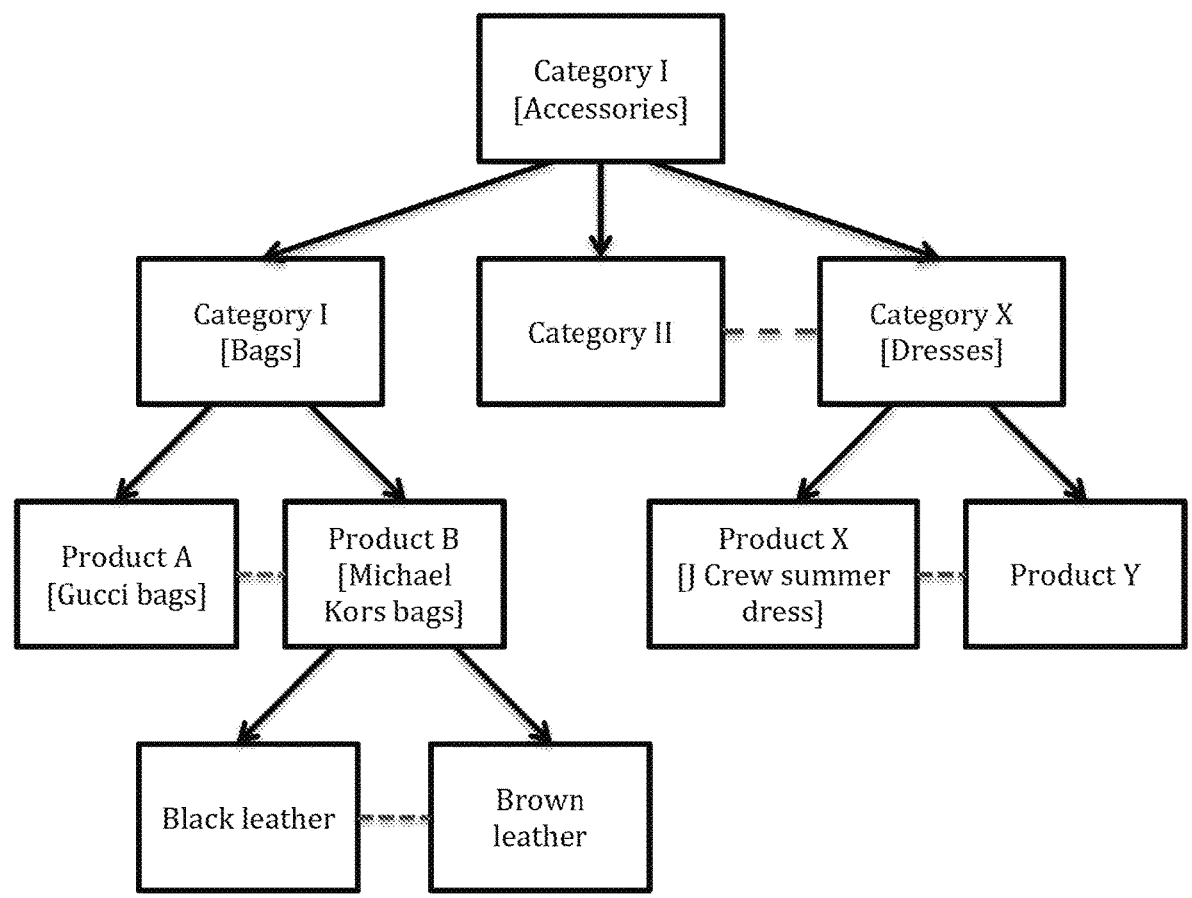
FIG. 4 is a diagram illustrating a database category hierarchy used for smoothing according to an embodiment of the present invention.

FIG. 4 is a diagram illustrating a database category hierarchy used for smoothing according to an embodiment of the present invention. The database category of "Accessories" is shown, with a couple database subcategories illustrated: "bags" and "dresses." Each database subcategory has a series of products. For "bags," example products are Gucci® bags and Michael Kors® bags. There can be many more database categories and subcategories as well. In addition, products can be characterized by features, such as black bags, leather bags, etc.

In some cases, there may be insufficient fetches of a bag to give a true indication of popularity. For example, if there have only been 5 fetches, but 4 purchases of a brown leather Michael Kors® bag, it would seem very popular (80% conversion rate), but there is not as much confidence as if there had been thousands of fetches with the same 80% conversion (purchase) rate. Original definitions of the features do not reflect the lack of confidence due to the low amount of data from the database. The present invention strives to provide a more appropriate adjustment to account for small sample bias. This is done by "smoothing," as detailed below. The feature of a product is iteratively smoothed, or adjusted, by the same feature calculated from a more general database category similar to this product. In one example, the feature of the next category up in the hierarchy (Michael Kors® bags) is incorporated into the calculation of brown leather Michael Kors® bags. Thus, if there are thousands of fetches of Michael Kors® bags, that is used in addition to the 5 fetches of the particular brown leather bag to improve the statistical significance of the feature calculation. This smoothing procedure is applied iteratively until the information from the root category is also incorporated. A desirable property of this algorithm is that, if the data for the specific product is abundant, the effect of the parent category is minimal or negligible. On the other hand, if the data for the specific product is lacking, the information from the parent category will prevail and the final smoothed feature will be mostly reflect the baseline value, rather than the possibly unreliable sample of the specific product. Note that this is done entirely by the recursive algorithm, with no heuristics necessary to reflect this logic. A weight for substantiating the prior information (data from the parent category) needs to be selected when combining the information from the product itself, versus information from the parent category. This weight can be determined empirically by carrying out experiments to determine the optimal balance.

In alternate embodiments, the data from the database for a parallel product groups at the same level in the hierarchy can be used, based on their similarity to the product group of interest. The hierarchy can be constructed based on product categorization, brand categorization, retailer categorization, style categorization, or combinations of any logical, hierarchical organization of products. In addition, the smoothing operation can be applied to any features used in ranking, such as time of day/week, seasonality, newness, brand uniqueness, popularity, product user-selection-rate, etc.

Smoothing Algorithm

In one embodiment, the following smoothing algorithm is used. Suppose we have a feature, originally defined to be (feature m)/(feature n), that is part of the set of features used for product ranking. An example of such feature would be user-selection-rate, defined to be (user-selections)/(fetches) (e.g., the number of times users have selected a product, divided by the number of times that product has been included in search results). The following smoothing algorithm provides an adjustment to the original value, such that when insufficient data is present (i.e. when the denominator feature is too few) for calculating the user-selection-rate for Node(i), baseline user-selection-rate from the parent node will be added to "smooth" over the original value.

$$\text{Smoothed Node}(i) = [\text{Node}(i).n + C \times \text{Smoothed}(\text{parent of Node}(i))] / [\text{Node}(i).m + C]$$

Node(i).m is the counts of the denominator feature m for Node(i).

Node(i).n is the counts of the numerator feature n for Node(i).

C is a tunable parameter that represents how much of the prior (parent category) information we take into account. The larger the value it is, the more of the effects of parent category.

Here's an example:

Suppose that we want to use the user-selection-rate (user-selections divided by fetches) of a product as an indicator of how attractive the product is to a user. Suppose that we will rank the products shown to the users using this metric alone.

For product Gucci® Bag A (i=Gucci® Bag A), Node(i).m would be the total number of fetches Gucci® Bag A had over the last two weeks window of time.

For product Gucci® Bag A (i=Gucci® Bag A), Node(i).n would be the total number of user-selections Gucci® Bag A received over the last two weeks window of time.

If we set C to 0 (which is one possibility), then effectively we are just calculating the original user-selection-rate (user-selections divided by fetches) of Gucci® Bag A. What this says is that we only care about the information we receive about this specific product, and we don't want to take into consideration the baseline user-selection-rate of Category Bags to which it belongs.

If, let's say, we decided that we don't trust the information coming from the product alone, then we can set C to a very large value. If we have a lot of data about this product, the influence coming from the parent category would be minimal. However, if we have very little data about this product, our estimation of its user-selection-rate would be dominated by the user-selection-rate of its parent category.

Let me use a concrete example to illustrate this.

Suppose we have two products A and B, both with user-selection-rate of 0.5 and belong to category Bags.

Product A received 1M fetches and half a million of them resulted in user-selections:

Non-Smoothed-User-selection-rate($A$)=500,000/1,000,000=0.5

On the other hand, product B received only 4 fetches and 2 of which resulted in user-selections.

Non-Smoothed-User-selection-rate($B$)=2/4=0.5.

Let's say the bags category has a user-selection-rate of 0.9.

If we set C to 10, then the Smoothed user-selection-rate of A and B are:

Smoothed User-Selection-Rate(A)=(500,000+1*0.9)/(1,000,000+1)=0.5000009, which is very, very close to 0.5—its product specific, non-smoothed user-selection-rate.

Smoothed-User-selection-rate(B)=(2+10*0.9)/(4+10) =0.78, this is definitely a number closer to its parent user-selection-rate of 0.9.

If we set C to 0.001, then the Smoothed user-selection-rate of A and B are:

Smoothed User-Selectin-Rate(A)=(500,000+1*0.001)/(1,000,000+0.001)=0.5000000005, still effectively the same as 0.5

Smoothed User-Selectin-Rate(B)=(2+10*0.001)/(4+0.001)=0.502, a lot closer to 0.5 than when C was 10.

System Diagram

Figure 5:
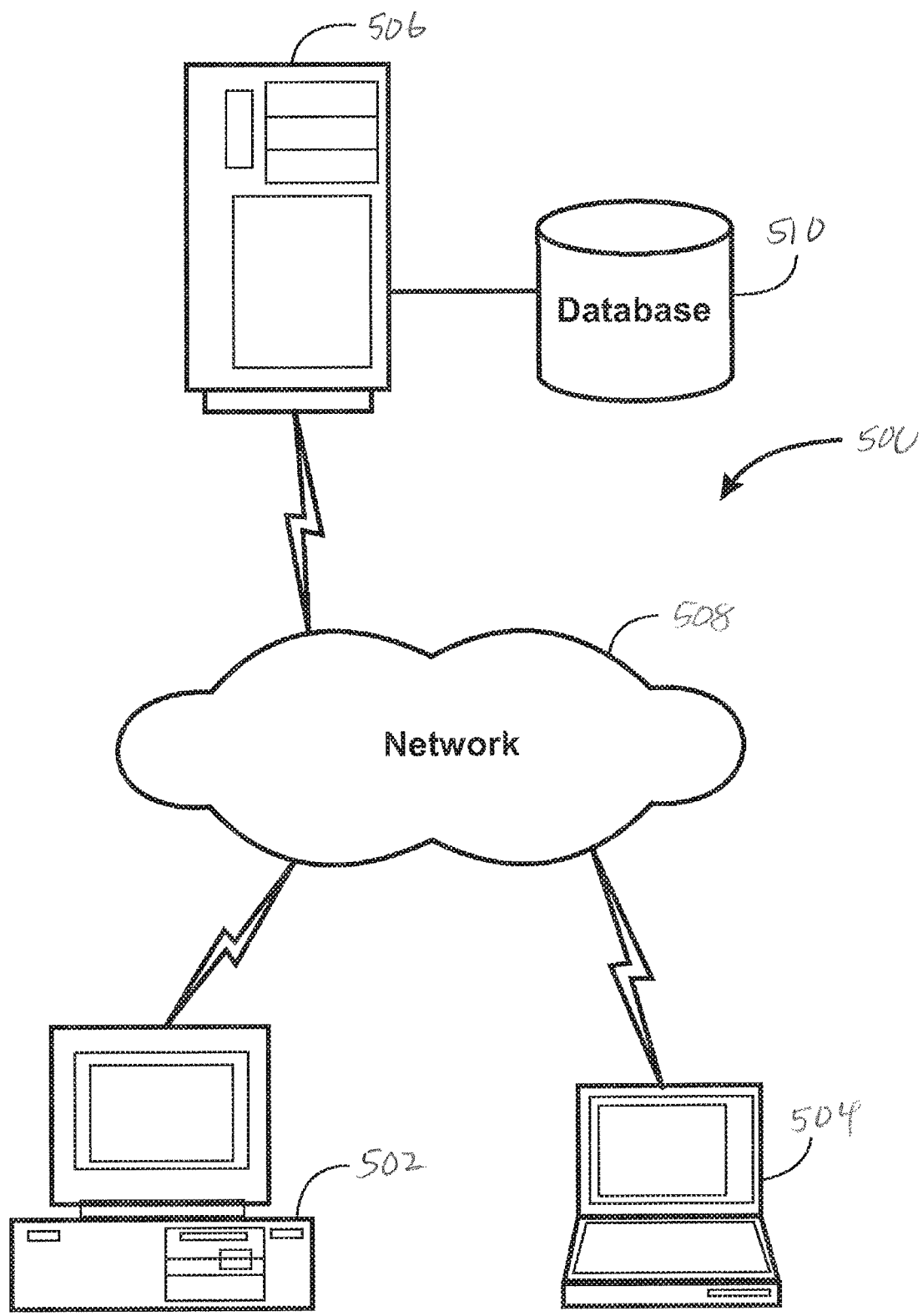
FIG. 5 is a diagram of a computer network system for accessing a database product search according to an embodiment of the present invention.

FIG. 5 is a diagram of computer network system 500 for accessing a database product search according to an embodiment of the present invention. A number of user computing devices 502 and 504 access a server 506 through the Internet 508. Server 506 accesses database 510, which contains the product data and style tables.

Figure 6:
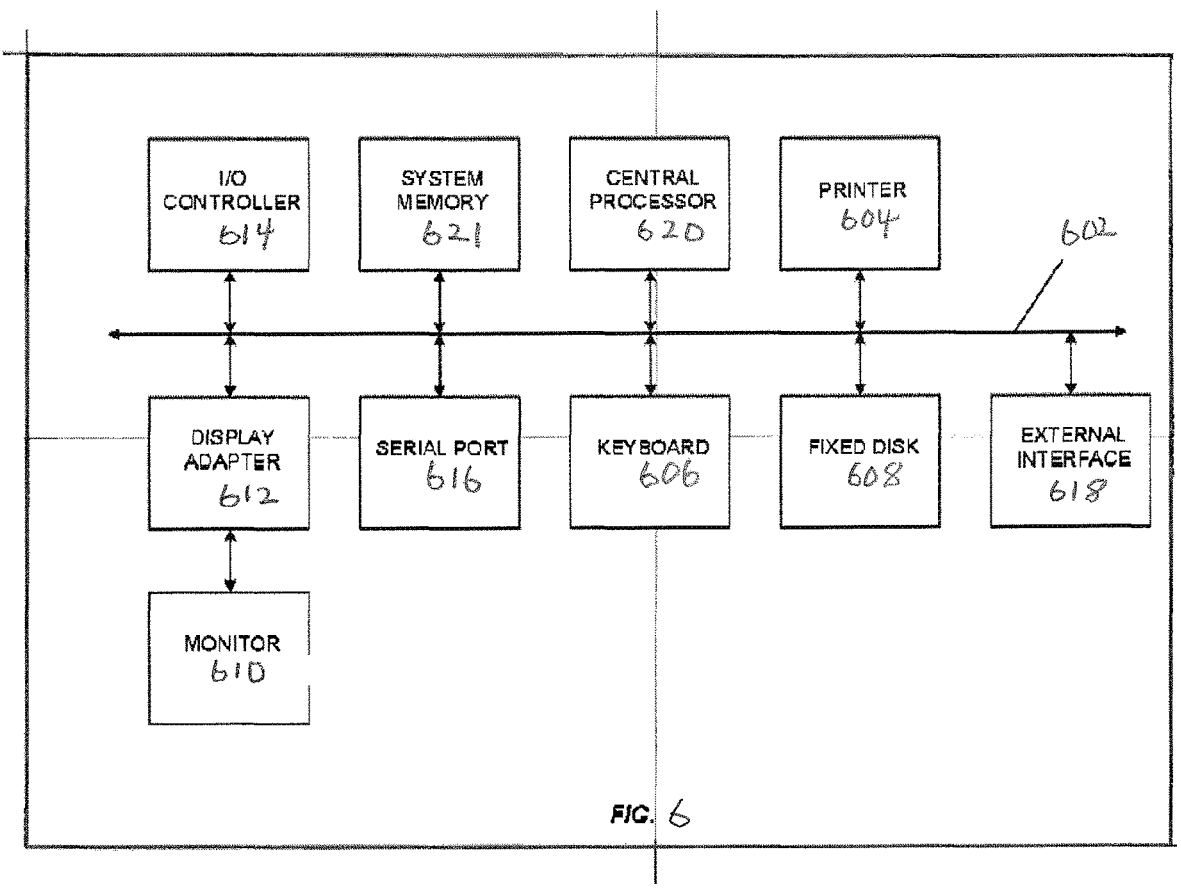
FIG. 6 is a diagram of a computer system for implementing a search according to an embodiment of the present invention.

FIG. 6 is a high level block diagram of a computer system that may be used to implement any of the entities or components described above, such as server 506 or computing device 502. The subsystems shown in FIG. 6 are interconnected via a system bus 602. Additional subsystems include a printer 604, keyboard 606, fixed disk 608, and monitor 610, which is coupled to display adapter 612. Peripherals and input/output (I/O) devices, which couple to I/O controller 614, can be connected to the computer system by any number of means known in the art, such as a serial port. For example, serial port 616 or external interface 618 can be used to connect the computer apparatus to a wide area network such as the Internet, a mouse input device, or a scanner. The interconnection via system bus 602 allows the central processor 620 to communicate with each subsystem and to control the execution of instructions from system memory 621 or the fixed disk 608, as well as the exchange of information between subsystems. The system memory 621 and/or the fixed disk may embody a non-transitory computer-readable medium for program instructions.

What is claimed is:

1. A computer implemented method for providing and ranking product search results, comprising:
receiving, at a server, search terms from a user over a network from a remote computing device, wherein the search terms are digitized, encrypted, and packetized;
classifying, by a processor at the server, the search terms as category search terms and style search terms;
applying, by the processor, the style search terms to a style table in a database, wherein applying the style search terms to the style table in a database comprises matching the style search terms to an index column, wherein the index column is associated with features and categories that correspond to each style search term, and wherein the features and categories that correspond to each style search term are used as additional style search terms;
obtaining the additional style search terms from the style table;
applying, by the processor, the category search terms, the style search terms, and the additional style search terms to a product database to obtain product results, wherein the product database comprises a hierarchy of database categories and subcategories including a root category and each database subcategory has a series of similar products and wherein each product has one or more features;
determining, by the processor, a ranking of the product results based on a degree of matching of the search terms and a number of searches, fetches, and user-selections;
applying a smoothing algorithm to the ranking of the product results such that a feature of a product in the product results is adjusted by the same feature calculated from a more general database category similar to the product in the product results, wherein the smoothing algorithm is applied iteratively starting from an immediate parent category having the same feature through each node of the hierarchy until information from the root category is incorporated and wherein the feature, for which the smoothing algorithm is applied, comprises one or more of seasonality, newness, and brand uniqueness;
transmitting the product results in ranked order from the server over the network to the remote computing device; and
displaying, on a display of the remote computing device, the product results in ranked order.

2. The computer implemented method of claim 1 further comprising:
weighting, by the processor, the additional style search terms from the style table.

3. The computer implemented method of claim 2 wherein:
the weights of the additional style search terms comprise both first weights assigned in the style table and second weights based on a user profile.

4. The computer implemented method of claim 3 further comprising:
applying, by the processor, additional weights based on similar user profiles.

5. The computer implemented method of claim 2 further comprising:
applying, by the processor, additional weights based on how many searches in a recent period of time.

6. The computer implemented method of claim 1 wherein:
the smoothing algorithm is applied to products having a limited search history.

7. The computer implemented method of claim 6 wherein:
the search results of a more general database category are weighted differently from the search results of a narrower database category.

8. A computer implemented method for providing and ranking product search results, comprising:
receiving, at a server, search terms from a user over a network from a remote computing device, wherein the search terms are digitized, encrypted, and packetized and wherein the search terms are classified as category search terms and style search terms, wherein the style search terms are applied to a style table in a database to obtain additional style search terms from the style table, and wherein applying the style search terms to the style table in a database comprises matching the style search terms to an index column, wherein the index column is associated with features and categories that correspond to each style search term, and wherein the features and categories that correspond to each style search term are used as additional style search terms;
applying the category search terms, style search terms, and additional style search terms to a product database to obtain product results, wherein the product database comprises a hierarchy of database categories and subcategories including a root category and each database subcategory has a series of similar products and wherein each product has one or more features;
ranking the product results according to at least one feature and according to a number of searches, fetches, and user-selections;
applying a smoothing algorithm to the ranking of the product results such that the at least one feature of a product in the product results is adjusted by the same feature calculated from a more general database category similar to the product in the product results, wherein the smoothing algorithm is applied iteratively starting from an immediate parent category having the same feature through each node of the hierarchy until information from the root category is incorporated and wherein the feature, for which the smoothing algorithm is applied, comprises one or more of seasonality, newness, and brand uniqueness; and
displaying the product results in ranked order.

9. The computer implemented method of claim 8 wherein:
the smoothing algorithm is applied to products having a limited search history.

10. The computer implemented method of claim 9 wherein:
the search results of a more general database category are weighted differently from search results of a narrower database category.

11. A system for providing and ranking product search results, the system comprising:
at least one database storing a plurality of documents; and
a server coupled to the at least one database, the server comprising:
a processor; and
a memory storing instructions that, when executed by the processor, cause the processor to perform operations comprising:
receiving search terms from a user over a network from a remote computing device, wherein the search terms are digitized, encrypted, and packetized;
classifying the search terms as category search terms and style search terms;
applying the style search terms to a style table in a database, wherein applying the style search terms to the style table in a database comprises matching the style search terms to an index column, wherein the index column is associated with features and categories that correspond to each style search term, and wherein the features and categories that correspond to each style search term are used as additional style search terms;
obtaining the additional style search terms from the style table;
applying the category search terms, the style search terms, and the additional style search terms to a product database to obtain product results, wherein the product database comprises a hierarchy of database categories and subcategories including a root category and each database subcategory has a series of similar products and wherein each product has one or more features;
determining a ranking of the product results based on a degree of matching of the search terms and a number of searches, fetches, and user-selections;
applying a smoothing algorithm to the ranking of the product results such that a feature of a product in the product results is adjusted by the same feature calculated from a more general database category similar to the product in the product results, wherein the smoothing algorithm is applied iteratively starting from an immediate parent category having the same feature through each node of the hierarchy until information from the root category is incorporated and wherein the feature, for which the smoothing algorithm is applied, comprises one or more of seasonality, newness, and brand uniqueness;
outputting the product results in ranked order for transmission over the network to the remote computing device for displaying, on a display of the remote computing device, the product results in ranked order.

12. The system of claim 11 wherein the instructions, when executed by the processor, cause the processor to perform operations further comprising:
weighting the additional style search terms from the style table.

13. The system of claim 12 wherein:
the weights of the additional style search terms comprise both first weights assigned in the style table and second weights based on a user profile.

14. The system of claim 13 wherein the instructions, when executed by the processor, cause the processor to perform operations further comprising:
applying additional weights based on similar user profiles.

15. The system of claim 12 wherein the instructions, when executed by the processor, cause the processor to perform operations further comprising:

applying additional weights based how many searches in a recent period of time.

\* \* \* \* \*